Patented Dec. 3, 1940

2,223,527

UNITED STATES PATENT OFFICE 2,223,527

MANUFACTURE OF ARTIFICIAL MATERIALS

William Henry Moss, London, England, assignor to Celanese Corporation of America, a corporation of Delaware No Drawing. Application November 3, 1936, Serial No. 108,969. In Great Britain December 5, 1935

4 Claims. (Cl. 154—2)

This invention relates to improvements in the manufacture of artificial materials and particularly to the manufacture of artificial materials having a basis of cellulose acetate or other cellulose derivative.

The manufacture of foils, films and similar materials of cellulose derivatives is frequently effected by casting a solution of the cellulose derivative on to a smooth surface, setting the foil or the like by removal of solvent and then stripping the product from the surface, while shaped products of cellulose derivatives are frequently produced by moulding a plastic mass containing cellulose derivative in suitable moulds. Again, it may be desirable that delicate articles, for example foils, should be carried temporarily upon a suitable backing in order to strengthen them and prevent them from being damaged, the backing being subsequently stripped from the foil or other article. In all cases of this character in which shaped articles of cellulose derivative are temporarily in contact with surfaces from which it is desired to remove them subsequently it is, of course, very desirable that they should strip easily from the surfaces in order that products of good quality may be obtained.

It has now been discovered that ethyl cellulose is a substance from which cellulose acetate can easily be stripped and according to the present invention ethyl cellulose is employed in the manufacture of cellulose acetate articles to form a surface which can subsequently be separated from the articles. For example it may form a surface on which foils, films, sheets, moulded articles or other shaped products are produced or a backing or the like for foils and other articles.

The present invention may be employed in numerous processes. For example in the production of large cellulose acetate sheets suitable, for example, for optical projection screens, the solution of cellulose acetate may be sprayed on to a wood or plaster surface which has been coated with ethyl cellulose by the application of a suitable solution. A surface of this character has the advantage that it is much smoother than a wood or plaster surface and it is considerably cheaper and easier to deal with than a sheet of glass. Again moulds of wood or other suitable material may be coated on their moulding surfaces with ethyl cellulose and moulds for moulding heated cellulose acetate masses may thus be obtained from which the shaped article may subsequently be easily removed.

Another application of the present invention is in the production of wooden or other articles, e. g. aeroplane propellors, which are impregnated with cellulose acetate. In one method for the production of such articles the propellor or other object is covered with a sheet of cellulose acetate which has been softened with a suitable solvent, e. g. acetone, and then wrapped with paper and enclosed in a rubber bag. The assembly is then subjected to air pressure in an autoclave, solvent and any air contained in the bag being removed through a suction pipe connected to the bag. When the operation is completed it is found that the paper is stuck to the propellor surface and has to be removed by grinding, and according to the present invention ethyl cellulose is employed to prevent adhesion of the cellulose acetate to the paper or other covering. For example the cellulose acetate sheet employed may have an outer surface of ethyl cellulose, or the inner surface of the covering may be of ethyl cellulose. Thus a cellulose acetate foil having an inner surface of ethyl cellulose or a foil consisting entirely of ethyl cellulose may be employed as covering. Alternatively, a bag which is impermeable to air and which is made of, or at least has an inner surface of, ethyl cellulose may be employed instead of the usual rubber bag.

A further application of the process of the present invention comprises the use of ethyl cellulose as a backing for cellulose acetate films or foils during processing. The backing may consist entirely of ethyl cellulose or it may consist mainly of another suitable substance and have merely a coating of ethyl cellulose in between the main backing and the cellulose acetate article. By the use of such backings the article may be processed with considerably reduced liability to damage and may subsequently be easily removed from the backing.

The process of the present invention has the particular advantage that adhesion between the two surfaces may be avoided even if the cellulose acetate is applied in solution in a solvent which attacks ethyl cellulose.

The following are examples of suitable solutions for use according to the process of the present invention:

*Example 1*

| | Parts by weight |
|---|---|
| Ethyl cellulose | 100 |
| Benzene | 320 |
| Alcohol | 100 |

The above solution is suitable for coating cellulose acetate foil or film or for the coating of wood, plaster or other surfaces upon which a cellulose acetate foil or film is to be produced.

*Example 2*

| | Parts by weight |
|---|---|
| Ethyl cellulose | 100 |
| Acetone | 400 |
| Benzene | 250 |
| Alcohol | 180 |
| Diacetone alcohol | 190 |

The above solution may be employed for coating plaster or other surfaces for the production of cellulose acetate foils or films and also for the coating of wood moulds and the like for use in molding cellulose acetate articles.

The most important feature of the present invention is the use of ethyl cellulose in connection with the production of articles having a basis of cellulose acetate, but the invention also includes the use of cellulose acetate to form a surface in the production of articles having a basis of ethyl cellulose.

Having described my invention, what I desire to secure by Letters Patent is:

1. Process for the treatment of aeroplane propellors and other shaped articles, which comprises subjecting an assembly comprising a shaped article covered with a softened sheet having a basis of a cellulose derivative to fluid pressure while the outer surface of the cellulose derivative sheet is in contact with an enveloping surface having a basis of another cellulose derivative so as to effect an intimate union between the shaped article and the cellulose derivative of the sheet and then separating the cellulose derivative enveloping surface from the shaped article, one of the cellulose derivative surfaces in contact having a basis of cellulose acetate and the other having a basis of ethyl cellulose.

2. Process for the treatment of aeroplane propellors and other shaped articles, which comprises subjecting an assembly comprising a shaped article covered with a softened sheet having a basis of cellulose acetate to fluid pressure while the outer surface of the cellulose acetate sheet is in contact with a surface having a basis of ethyl cellulose so as to effect an intimate union between the shaped article and the cellulose acetate and then separating the ethyl cellulose surface from the treated article.

3. Process for the production of articles coated with a cellulose derivative, which comprises subjecting an assembly comprising a shaped article covered with a softened film having a basis of a cellulose derivative to pressure while said film is in contact with an enveloping surface having a basis of another cellulose derivative so as to effect a substantially permanent union between said shaped article and said film, and then removing said cellulose derivative enveloping surface from said shaped article, one of said cellulose derivatives being cellulose acetate and the other being ethyl cellulose.

4. Process for the production of articles, coated with cellulose acetate, which comprises subjecting an assembly comprising a shaped article covered with a softened film having a basis of cellulose acetate to pressure while the film is in contact with an enveloping surface having a basis of ethyl cellulose so as to effect a substantially permanent union between said shaped article and said film and then removing the ethyl cellulose enveloping surface from said shaped article.

WILLIAM HENRY MOSS.